United States Patent Office 3,652,563
Patented Mar. 28, 1972

3,652,563
2-OXO-HEXAHYDROPYRIMIDYL-
N,N'-ALKANOIC ACIDS
Harro Petersen and Klaus-Christian Renner, Frankenthal,
Pfalz, Germany, assignors to Badische Anilin- & Soda-
Fabrik Aktiengesellschaft, Ludwigshafen (Rhine), Germany
No Drawing. Filed Aug. 8, 1968, Ser. No. 751,071
Claims priority, application Germany, Aug. 9, 1967,
P 16 70 263.9
Int. Cl. C07d 51/18
U.S. Cl. 260—251 R                               5 Claims

ABSTRACT OF THE DISCLOSURE

Ureidopropionic acids of the formula:

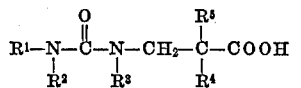

wherein $R^1$ to $R^5$ denote identical or different aliphatic, cycloaliphatic, araliphatic or aromatic radicals, said ureidopropionic acids being prepared by reacting a ureidopropionaldehyde having the formula:

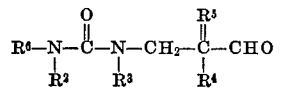

with an oxidizing agent at a temperature of from 0° to 100° C., said acids being useful as paper finishing agents and as starting materials for the production of paper finishing agents and herbicides.

This invention relates to the production of ureidopropionic acids by oxidation of ureidopropionaldehydes and to new substances of this type.

An object of this invention is to provide a new process for the production of a large number of ureidopropionic acids in good yields and purity using readily accessible starting materials.

Another object of this invention is the new ureidopropionic acids themselves.

These and other objects of the invention are achieved and ureidopropionic acids having the general Formula I:

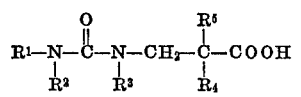

in which $R^1$, $R^2$, $R^3$, $R^4$ and $R^5$ denote identical or different aliphatic, cycloaliphatic, araliphatic or aromatic radicals, $R^1$ may also denote the radical:

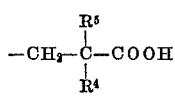

in which $R^4$ and $R^5$ have the above meanings, $R^2$ may denote a hydrogen atom, $R^3$ may denote a hydrogen atom, and the radicals $R^2$ and $R^3$ together with the urea group may form a ring, are advantageously obtained when a ureidopropionaldehyde having the general Formula II:

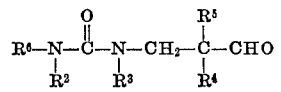

in which $R^2$, $R^3$, $R^4$ and $R^5$ have the above meanings, $R^6$ denotes an aliphatic, cycloaliphatic, araliphatic or aromatic radical or the radical:

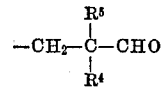

in which $R^4$ and $R^5$ have the above meanings, is reacted with an oxidizing agent at a temperature of from 0° to 100° C.

The reaction may be reproduced, in the case when N,N-dimethylureido-(N')-neopentanal and hydrogen peroxide are used, by the following equation:

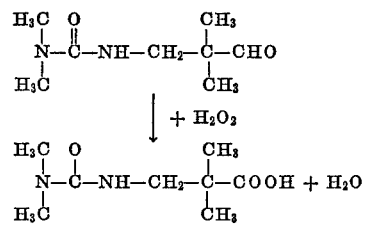

The process according to this invention surprisingly gives a large number of ureidopropionic acids using readily accessible materials, in a good yield and purity, without secondary reactions, for example polycondensation, elimination of the ureido group, elimination of the urea grouping with the formation of numerous byproducts, playing a part.

The starting materials are ureidopropionaldehydes having the general Formula II which can easily be prepared for example by reaction of a urea with two moles of aldehyde of which at least one mole has to have CH-acid character in an acid medium as described for example in U.S. patent application Ser. No. 661,515, filed Aug. 18, 1967, by Harro Petersen, now U.S. Pat. No. 3,551,423 dated Dec. 29, 1970.

Preferred starting materials (II) and accordingly preferred end products (I) are those in whose formulae $R^1$ to $R^6$ denote identical or different alkyl, cycloalkyl, aralkyl or aryl groups each having up to eighteen, particularly up to seven, carbon atoms, $R^1$ may also denote the radical:

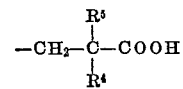

$R^6$ may denote the radical:

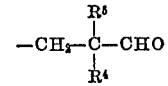

and $R^2$ and $R^3$ may denote hydrogen atoms, and the radicals $R^2$ and $R^3$ together with the urea group may form a five-membered or six-membered heterocyclic ring which may bear one or two of the said groups as substituents. The said alkyl groups may be linear or branched.

For example the following ureidopropionaldehydes may be used as starting materials (II):

N,N-dimethylureido-N'-neopentanal,
N,N'-dimethylureido-N,N'-dineopentanal,
2-oxomidazolidine-N,N'-dineopentanal,
N-methyl-2-oxoimidazolidine-N'-neopentanal,
2-oxohexahydropyrimidyl,N,N'-dineopentanal,
2-oxohexahydropyrimidyl-N-methyl-N'-neopentanal,
2-ethyl-2-butyl-3-(N-methylhexahydropyrimidyl-(N')-)propionaldehyde,
2-oxo-5,5-dimethylhexahydropyrimidyl-N,N'-dineopentanal,
2-oxo-5,5-dimethyl-6-isopropylhexahydropyrimidyl-N-neopentanal.

Organic or inorganic oxidizing agents such as alkali metal or alkaline earth metal peroxides; organic peroxides, for example diethyl peroxide; their adducts, for example sodium peroxoborate; peroxy acids, for example peroxomonosulfuric acid, peractic acid; manganese (IV) or chromium (VI) compounds, for example manganese dioxide, permanganates, chromic anhydride, bichromates; may be used as oxidizing agents. They may be supplied to the reaction in a stoichiometric amount or in excess with reference to the starting material (II), with the above-mentioned oxidizing agents preferably in an excess of up to 0.5 times. It is preferable to use oxygen or mixtures containing the same as oxidizing agents in the presence of metal catalysts. The reaction is carried out as a rule with an excess of oxygen over the stoichiometric amount in the presence of copper salts and/or silver salts. It is advantageous to use as metal catalysts copper (I) oxide and silver nitrate together in a total amount of 1 to 40% by weight with reference to the starting material (II) and a molar ratio of copper oxide:silver nitrate of from 1:1 to 1:0.01.

The reaction may be carried out at a temperature of from 0° to 100° C., preferably from 30° to 80° C., at atmospheric pressure or at superatmospheric pressure, continuously or batchwise. It is advantageous to use solvents which are inert under the reaction conditions such as water; inorganic or organic acids, for example sulfuric acid or acetic acid; alkanols, for example methanol or butanol; or mixtures of the same.

The reaction may be carried out as follows: A mixture of sodium hydroxide, water and, if desired, a metal catalyst has added to it, at the said temperature, the starting material (II), further amounts of caustic soda solution and the oxidizing agent at a slow rate. When oxygen or air is used as the oxidizing agent, air or oxygen is advantageously passed through the reaction mixture during the whole of the reaction period. The mixture is kept at the said temperature for two to six hours while mixing well. The reaction mixture is then filtered and the filtrate is cooled and adjusted with acid to a pH value of 3.5. The filtrate is then allowed to stand for a long time and the deposited end product is separated; further amounts of end product may be recovered from the mother liquor by concentration. The end product may be recrystallized from ethyl acetate, water or acetic acid if necessary.

The procedure may be varied in any way depending on the oxidizing agent used. For example in the case of hydrogen peroxide, the starting material (II) and, if desired, the solvent may be placed in the reactor and the oxidizing agent added; the addition of caustic soda solution, catalyst and acid may be dispensed with.

The compounds which can be prepared by the process according to the invention are paper finishing agents and valuable starting materials for the production of paper finishing agents and herbicides. For example paper may be impregnated therewith from aqueous suspensions using 50 grams per kilogram of paper pulp, together with formaldehyde, and dried at from 70° to 120° C. Paper finished in this way exhibits improved tear resistance and colarability.

The invention is illustrated by the following examples.
The parts given in the following examples are parts by weight.

EXAMPLE 1

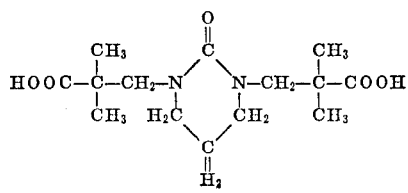

21 parts of sodium hydroxide is dissolved in 800 parts of water in a stirred apparatus and the solution is heated up to 55° C. 30 parts of copper (I) oxide is added to this solution and then while stirring a solution of 6 parts of silver nitrate in 50 parts of water is added. 161 parts of 2-oxohexahydropyrimidyl-N,N'-dineopentanal and a solution of 42 parts of sodium hydroxide in 150 parts of water are simultaneously supplied to this mixture while stirring and passing in oxygen. The temperature of the mixture rises and is held at 63° to 65° C. by cooling the reactor. Oxygen or air is then passed through at this temperature for three hours with constant stirring. The catalyst is filtered off from the mixture and the filtrate is cooled to room temperature and adjusted to pH 3.5 with 20% by weight hydrochloric acid. The filtrate is allowed to stand for several hours and the deposited end product is filtered off. 160 parts of 2-oxohexahydropyrimidyl-N,N'-dipivalic acid is obtained. Another 8 parts of end product may be obtained by concentrating the mother liquor. The total yield is 93.5% of the theory. Purification is carried out by recrystallization from ethyl acetate. The melting point is 163 to 165° C.

*Analysis.*—$C_{14}H_{24}O_5N_2$ (300). Calculated (percent): C, 56.0; H, 8.0; O, 26.6; N, 9.3. Found (percent): C, 56.0; H, 7.9; O, 26.8; N, 8.9.

EXAMPLE 2

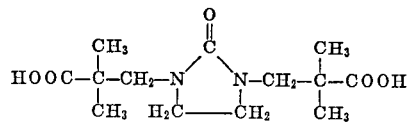

A mixture of 127 parts of 2-oxoimidazolidinyl-N,N'-dineopentanal in 800 parts of water in a stirred apparatus has 130 parts of hydrogen peroxide added to it at 70° C. in the course of two hours. The reaction mixture is heated for six hours at 70° to 80° C. while stirring and then cooled and recrystallized. 130 parts of 2-oxoimidazolidinyl-N,N'-dipivalic acid is obtained, i.e. 91% of the theory. The end product can be recrystallized from water. The melting point is 202° to 203° C.

*Analysis.*—$C_{13}H_{22}O_5N_2$ (286). Calculated (percent); C, 54.5; H, 7.8; O, 28.0; N, 9.7. Found (percent) C, 54.4; H, 7.9; O, 27.8; N, 9.5.

EXAMPLE 3

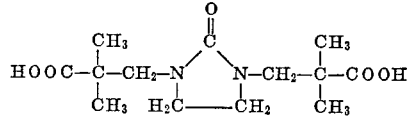

21 parts of sodium hydroxide is dissolved in 800 parts of water and the solution thus formed is heated to 55° C. 30 parts of copper (I) oxide is added to this solution followed by a solution of 6 parts of silver nitrate in 50 parts of water while stirring, 153 parts of 2-oxoimidazolidinyl-N,N'-dineopentanal and a solution of 42 parts of sodium hydroxide in 150 parts of water are added simultaneously while stirring and passing in air. The temperature of the reaction mixture rises and is kept at 63° to 65° C. by cooling. Air is then passed through the reaction mixture for three hours at this temperature with continuous stirring. The catalyst is filtered off from the mixture and the filtrate is cooled and adjusted to a pH value of 3.5 with 20% by weight hydrochloric acid. The end product is precipitated from the filtrate after it has been stirred for several hours. The end product is filtered off and dried. 157 parts of 2-oxoimidazolidinyl-N,N'-dipivalic acid is obtained. Another 5 parts of end product can be recovered by concentrating the mother liquor. The total yield is 162 parts, equivalent to 94% of the theory. It has a melting point of 200° to 204° C. after it has been recrystallized from water.

*Analysis.*—$C_{13}H_{22}O_5N_2$ (286). Calculated (percent): C, 54.5; H, 7.8; O, 28.0; N, 9.7. Found (percent) C, 54.7; H, 7.9; O, 28.1; N, 9.4.

The infrared spectrum of the product agrees with the infrared spectrum of 2-oxoimidazolidinyl-N,N'-dipivalic acid prepared according to Example 2.

EXAMPLE 4

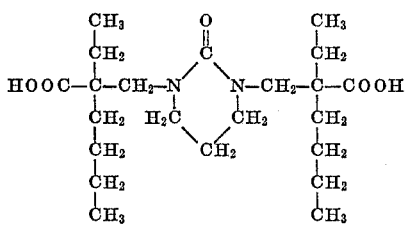

A mixture of 1000 parts of 2.5% by weight caustic soda solution, 35 parts of copper (I) oxide and 8 parts of silver nitrate are placed in a stirred apparatus and 190 parts of 2 - oxohexahydropyrimidyl - N,N' - bis-(2-ethyl-2-butyl-propionaldehyde) and 200 parts of a 25% by weight caustic soda solution are supplied simultaneously while stirring and passing in air. The reaction temperature is kept at from 65° to 70° C., by cooling. The mixture is kept at 65° to 70° C., for three hours while continuously passing in air, filtered, the filtrate adjusted to a pH value of 4 with hydrochloric acid of 20% by weight strength and cooled to room temperature. After the filtrate has stood for one day the deposited end product is filtered off and dried. 195 parts of 2-oxo-hexahydropyrimidyl-N,N'-bis-(2-ethyl-2-butylpropionic acid) is obtained, equivalent to 94% of the theory.

*Analysis.*—$C_{25}H_{40}O_5N_2$ (448). Calculated (percent): C, 67.0; H, 8.9; O, 17.9; N, 6.25. Found (percent): C, 66.8; H, 8.9; O, 17.6; N, 6.1.

EXAMPLE 5

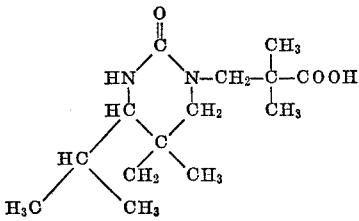

8 parts of sodium hydroxide, 9 parts of copper (I) oxide and a solution of 1 part of silver nitrate in 8 parts of water are added to 350 parts of water, and the mixture is heated to 55° C. While it is continuously stirred and air is being passed in, 76 parts of 2-oxo-5,5-dimethyl-6-iso-propylhexahydropyrimidyl-N-neopentanal and a solution of 16 parts of sodium hydroxide in 50 parts of water are slowly added simultaneously. The temperature of the mixture rises and is kept at 65° C. Three hours later the catalyst is filtered off from the mixture. The filtrate is adjusted to a pH value of 3.5 with 20% by weight hydrochloric acid. Some hours later the 2-oxo-5,5-dimethyl-6-isopropylhexahydropyrimidyl-N-pivalic acid deposited is filtered off. 73 parts is obtained. Another 2 parts is recovered by concentrating the mother liquor. The total yield is 75 parts, i.e. 92% of the theory. The melting point is 220° to 221° C. after the product has been recrystallized from acetic acid.

*Analysis.*—$C_{14}H_{26}O_3N_2$ (270). Calculated (percent): C, 62.2; H, 9.7; O, 17.7; N, 10.3. Found (percent): C, 62.7; H, 9.8; O, 17.5; N, 10.3.

EXAMPLE 6

2-oxo-5,5-dimethylhexahydropyrimidyl-N-pivalic acid:

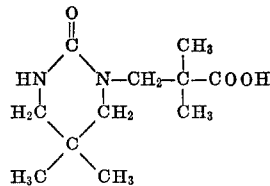

8 parts of sodium hydroxide, 9 parts of copper (I) oxide and a solution of 1 part of silver nitrate in 8 parts of water are added to 350 parts of water and the mixture is then heated to 55° C. While continuously stirring and passing in air, 43 parts of 2-oxo-5,5-di-methylhexahydro-pyrimidyl-N-neopentanal and a solution of 16 parts of sodium hydroxide in 50 parts of water are slowly added. The temperature of the mixture rises and is kept at 65° C. Three hours later the catalyst is filtered off from the mixture and may be used just as it is for further oxidations. The filtrate is adjusted to pH 3.5 with 20% by weight hydrochloric acid and cooled. The precipitated 2-oxo-5,5-dimethylhexahydropyrimidyl-N-pivalic acid is filtered off. 32 parts is obtained. Another 6 parts is obtained by concentrating the mother liquor. The total yield is 38 parts, i.e. 83.5% of the theory. The melting point is 209° to 211° C. after recrystallization from acetic acid.

*Analysis.*—$C_{11}H_{20}O_3N_2$ (228). Calculated (percent): C, 57.9; H, 8.8; O, 21.0; N, 12.3. Found (percent): C, 58.1; H, 9.0; O, 21.1; N, 11.8.

EXAMPLE 7

N,N-dimethylureido-N'-pivalic acid:

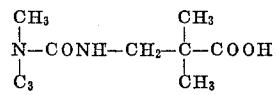

A mixture of 172 parts of N,N-dimethylureido-N'-neopentanal in 600 parts of water is placed in a stirred apparatus and 120 parts of a 30% by weight aqueous solution of hydrogen peroxide is added in the course of two hours at 65° C. The reaction mixture is then heated for four hours at room temperature and the deposited end product is filtered off. 140 parts of N,N-dimethylureido-N'-pivalic acid is obtained, i.e. 74.5% of the theory. The product may be purified by recrystallization from ethyl acetate. The melting point is 141° C.

*Analysis.*—$C_8H_{16}O_3N_2$ (188). Calculated (percent): C, 51.0; H, 8.5; O, 25.5; N, 14.9. Found (percent): C, 50.8; H, 8.5; O, 25.6; N, 14.8.

EXAMPLE 8

N,N-dimethylureido-N'-pivalic acid:

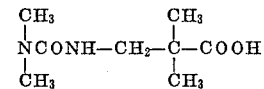

8 parts of sodium hydroxide is dissolved in 350 parts of water and the solution is heated to 55° C. 4 parts of copper (I) oxide and a solution of 0.5 part of silver nitrate in 10 parts of water are added to this solution. 37 parts of N,N-dimethyl-ureido-N-neopentanal and a solution of 13 parts of sodium hydroxide in 50 parts of water are added simutlaneously while stirring and passing in air. The temperature of the mixture rises and is kept at 63° to 65° C. Three hours later the catalyst is filtered off from the mixture and the filtrate is cooled and adjusted to pH 3.5 with 20% by weight hydrochloric acid. Some time later the deposited N,N-dimethylureido-N'-pivalic acid is filtered off. 30 parts is obtained. Another 7 parts is recovered by concentrating the mother liquor. The total yield is 37 parts, i.e. 91.5% of the theory. The melting point is 140° to 142° C. after recrystallization from ethyl acetate.

*Analysis.*—$C_8H_{16}O_3N_2$ (188). Calculated (percent): C, 51.0; H, 8.5; N, 14.9; , 25.5. Found (percent): C, 51.0; H, 8.6; N, 15.2; O, 25.5.

We claim:

1. A compound of the formula:

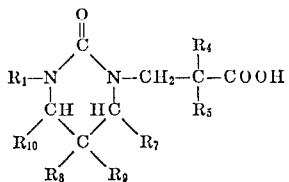

wherein $R_1$ is hydrogen, alkyl of 1 to 7 carbon atoms or

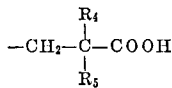

$R_4$ and $R_5$ are alkyl of 1 to 7 carbon atoms; and $R_7$, $R_8$, $R_9$ and $R_{10}$ are hydrogen or alkyl of 1 to 7 carbon atoms.

2. A compound as in claim 1 of the formula

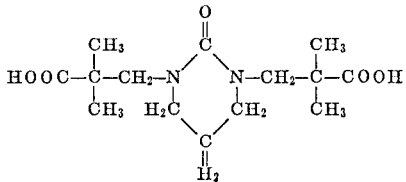

3. A compound as in claim 1 of the formula

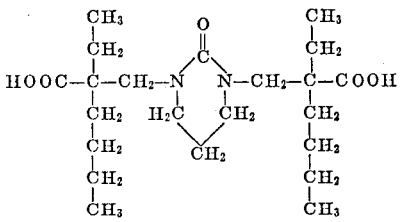

4. A compound as in claim 1 of the formula

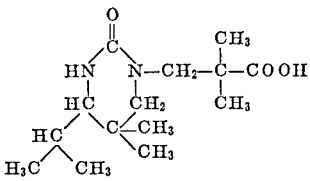

5. A compound as in claim 1 of the formula

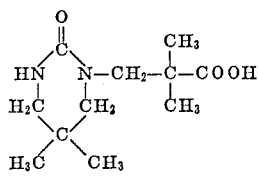

References Cited
UNITED STATES PATENTS

| | | | |
|---|---|---|---|
| 3,118,935 | 1/1964 | Lynn et al. | 260—530 |
| 3,253,025 | 5/1966 | Brill et al. | 260—530 |
| 3,361,805 | 1/1968 | Fernholz et al. | 260—530 |

ALEX MAZEL, Primary Examiner

R. V. RUSH, Assistant Examiner

U.S. Cl. X.R.

117—154; 162—158; 260—309.7, 530 R, 534 R

UNITED STATES PATENT OFFICE
CERTIFICATE OF CORRECTION

Patent No. 3,652,563                     Dated March 28, 1972

Inventor(s) Harro Petersen and Klaus Christian Renner

It is certified that error appears in the above-identified patent and that said Letters Patent are hereby corrected as shown below:

Column 2, lines 18 to 20, that portion of the formula reading

Column 2, line 63, "2-oxomidazolidine-N,N'-dineopentanal" should read -- 2-oxoimidazolidine-N,N'-dineopentanal --.

Column 5, lines 49 to 51, that portion of the formula reading
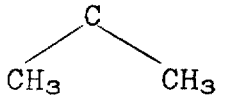

Column 6, line 38, that portion of the formula reading "C_3" should read -- $CH_3$ --; line 67, "simutlaneously" should read -- simultaneously --.

Signed and sealed this 5th day of December 1972.

(SEAL)
Attest:

EDWARD M. FLETCHER, JR.
Attesting Officer

ROBERT GOTTSCHALK
Commissioner of Patents